United States Patent [19]
Johnson

[11] 4,425,240
[45] Jan. 10, 1984

[54] PLUNGING WATER JETS FOR OIL SPILL CONTAINMENT AND RECOVERY

[76] Inventor: Michael G. Johnson, 145 Branch Ave., Red Bank, N.J. 07701

[21] Appl. No.: 131,531

[22] Filed: Mar. 18, 1980

[51] Int. Cl.³ .......................... E02B 15/04; C02F 1/40
[52] U.S. Cl. ................................. 210/801; 210/242.3; 210/923
[58] Field of Search ....... 210/83, 84, 242 S, DIG. 25, 210/801

[56] References Cited

U.S. PATENT DOCUMENTS

| | | | |
|---|---|---|---|
| 3,962,093 | 6/1976 | Gibson | 210/242 |
| 4,033,869 | 7/1977 | McGrew | 210/242 |
| 4,059,526 | 11/1977 | Middelbeek | 210/242 S |
| 4,128,068 | 12/1978 | Ogura | 210/242 S |

FOREIGN PATENT DOCUMENTS 7602227  3/1976  Netherlands .................... 210/242 S Primary Examiner—Benoit Castel
Attorney, Agent, or Firm—Cushman, Darby & Cushman

[57] ABSTRACT

A compact coherent jet of water is directed downward into a body of water to create surface currents flowing outward from the jet that carry along floating substances, such as an oil slick. Relative horizontal movement between the jet and the body of water creates a bow wave that diverges downstream to push floating substances laterally of the jet as respects the direction of the relative movement. A line of such jets is used to divert an oil slick. Laterally-spaced jets in front of an oil skimmer are used to funnel an oil slick into the skimmer entrance.

5 Claims, 5 Drawing Figures

PLUNGING WATER JETS FOR OIL SPILL CONTAINMENT AND RECOVERY

FIELD OF THE INVENTION

This invention relates to the movement, confinement, concentration and collection or recovery of unwanted floating substances or materials, especially oil spills.

BACKGROUND OF THE INVENTION

Many types of apparatus and processes have been suggested, and some utilized, for the movement, confinement, concentration and collection of unwanted floating substances and materials, such as oil spills. Most involve the technique of concentrating a wide shallow oil slick into a narrow deeper slick to enable a mobile collecting or recovery device, usually of the skimmer type, to pick up the oil in less time and with a greater oil to water ratio with resultingly increased efficiency. Exemplary of such suggestions, and some utilizations, are the disclosures of the following U.S. Pat. Nos. Mueller 3,659,713 May 2, 1972 Petersen et al 3,661,264 May 9, 1972 Bell 3,708,070 Jan. 2, 1973 Graham 3,762,169 Oct. 2, 1973 McGrew 4,033,869 July 5, 1977 Ogura et al 4,128,068 Dec. 5, 1978

Probably the most widely used of the suggestions advanced by the foregoing patents involves a mobile floating collection or recovery device equipped with a pair of forwardly diverging arms or booms, or their equivalent, for funneling unwanted floating substances into the forward end of the device as it sweeps the area where the substance is floating. In some, the arms are in the form of partially-submerged scoop-like wings or baffles. Exemplary of this construction is the disclosure of the above patent to Bell. This also discloses the use of jets of water on the upstream sides of the wings or baffles, some above and some below the surface of the water, angled generally toward the forward end of the collection device for assisting in concentrating and moving the floating substances into the collection device and to prevent an oil slick from moving over or under the wings or baffles in wave action. According to the above Petersen et al patent, one of the arms comprises the collection device itself, while the other arm is a log boom equipped with submerged nozzles for emitting underwater fan-shaped jets of water angled upwardly and toward the other arm or collecting device.

According to others of the above patents, i.e., Mueller and McGrew, the arms are disposed entirely above water and are equipped with nozzles for creating fan-shaped or continuous curtains of air or water jets to concentrate and move a floating substance into the collection device.

Lastly, the above listed Graham patent discloses the use of horizontal fan-shaped water jets at the water's surface for constrictionally surrounding an oil slick confined within a containment boom for concentrating and moving the slick into a collection device at one side of the boom.

All such systems, however, have disadvantages. The many and variously-angled water jets of Bell tend to mix floating oil with water, necessitating the handling of much more water by the collection device and thus greatly lowering its efficiency. The continuous fluid curtain of Mueller is, accordidng to the patent, preferably of air. If of water, the pumping requirements of the system, as is easily understood, would be economically almost prohibitive. Almost the same can be said of an air curtain because of the large requirements of power, weight and boat space for air compressors. The fluid curtains of Mueller and also the multiple variously-angled fan-shaped jets of McGrew tend to entrain water with the oil with the attendant same disadvantages as the Bell system.

The Petersen et al system has some one of the disadvantages of Bell, i.e., mixing of water with the oil. Moreover, it is doubtful that the Peterson system would be effective in a high current or in high wave action.

As far as the applicant is aware, the Graham system has not been used. It would be very cumbersome and require much effort to deploy.

As a matter of fact, none of the techniques disclosed in the above patents are actively used to control oil spills at the present time. Current practice is to use only floating barriers of booms, either solid or inflatable, to concentrate and control flow of an oil spill into a skimmer type of collecting device.

BRIEF SUMMARY OF THE INVENTION

Accordingly, it is an object of this invention to provide an improved system for moving, confining and concentrating unwanted floating substances or materials, especially oil spills, for collection or recovery.

It is another object of this invention to provide such a system that is simple in design and operation and thus less expensive to construct, operate and maintain than systems known heretofore.

It is still another object of this invention to provide such a system that will minimize mixing of an oil slick with water and thus promote the more effective and efficient utilization of a device for collecting or recovering the floating oil.

The foregoing objects are attained by the use of one or more coherent compact jets of water directed substantially vertically downward into a body of water from above the surface thereof to create surface currents that move outward from the point of impact of each jet and carry along therewith floating substances or materials.

Other objects and advantages of the invention will become evident from the following detailed description and accompanying drawings in which:

DETAILED DESCRIPTION OF THE INVENTION

Figure 1:
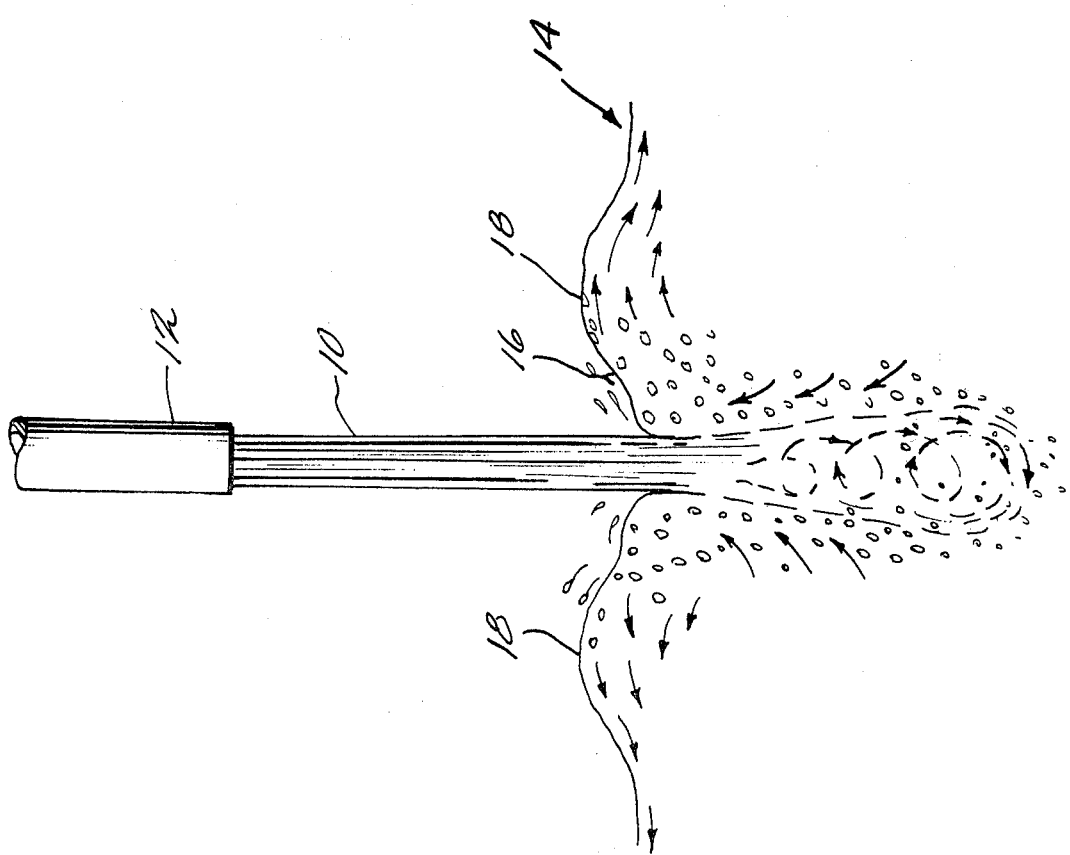
FIG. 1 is a partly diagrammatic view, in elevation and partly in vertical section, illustrating the action of a downward directed coherent compact jet of water when it plunges into a body of water.

Referring now to FIG. 1 of the drawings, there is shown the effect caused by directing a coherent compact jet of water 10 from an elevated nozzle 12 downward into a body of water 14. The words "coherent"

and "compact" are used to distinguish from a spray or a fan-shaped jet or one which has considerable divergence. When the jet 10 plunges into the water 14, it creates a surrounding crater 16 having a rim 18 higher than the undisturbed surface of the body of water caused by an upheaval, upwelling or rising of water around the crater 16, as indicated by the arrows about the penetrating portion of the jet. The upheaval causes water to flow outward from the crater 16. The elevation of the nozzle 12 also causes the jet 10 to entrain air which mixes with the water at the point of deepest penetration of the jet to form a biphasic buoyant mixture that tends to rise. As it rises, the entrained air forms bubbles which as they rise expand and induce and enhance the upheaval of water about the crater 16 as shown in FIG. 1. The upheaval and elevated rim 18 of the crater 16 create surface currents flowing outward from the crater, with the currents having a gradient of increasing velocity toward the surface as shown by the arrows in FIG. 1. Since the bubbles take some time to rise to the surface, their effect in producing the surface currents is prolonged.

The foregoing effects of a coherent compact jet or stream of water plunging downward into a body of water are known, but they have not been utilized heretofore for moving and/or concentrating floating substances or materials.

Figure 2:
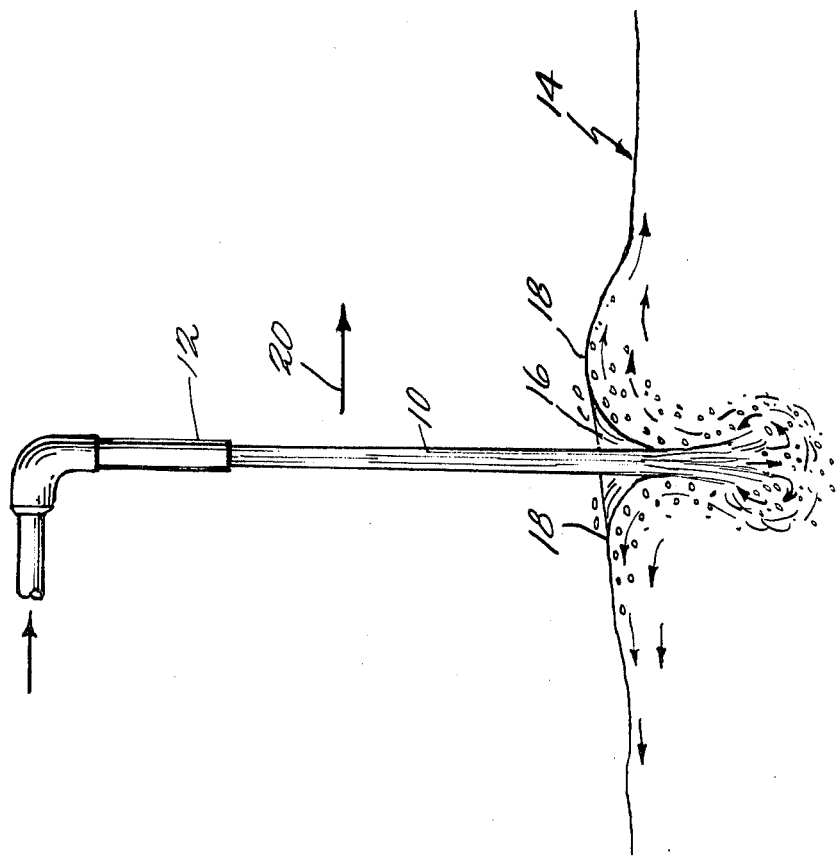
FIG. 2 is a view corresponding to FIG. 1 but illustrating the effect of moving the jet horizontally along and above the surface of the water, or the water relative to the jet.
Figure 3:
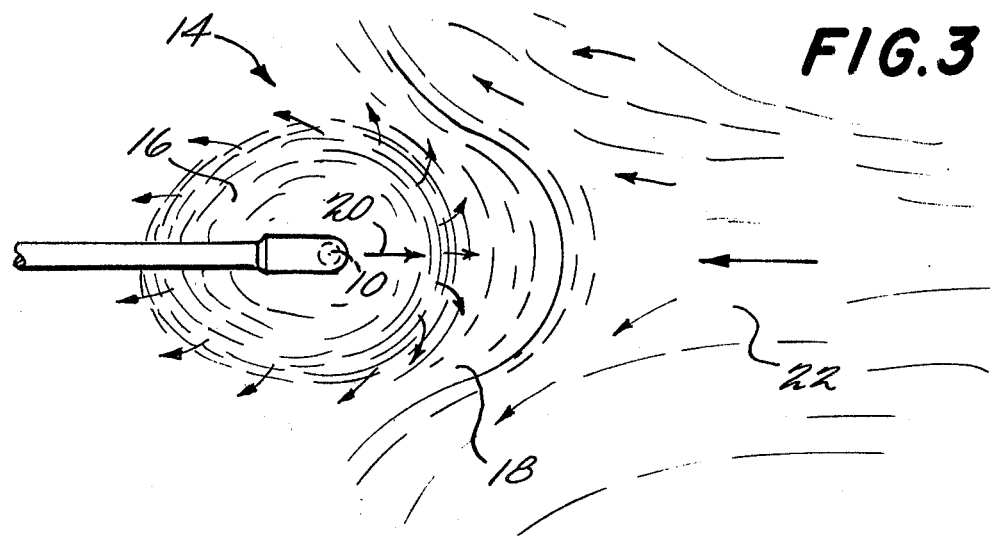
FIG. 3 is a plan view corresponding to FIG. 2.

As shown in FIGS. 2 and 3, when the jet 10 is moved horizontally along and above the surface of the body of water 14 in the direction indicated by the arrow 20, or conversely the body of water moves horizontally, as by a current, relative to the jet 16, the effect of the plunging jet is distorted. The crater and its rim 18 are no longer symmetrical with respect to the jet but are moved somewhat downstream. Moreover, the upheaval or upwelling about the crater 16 is higher on the upstream and lateral sides of the jet 10 than on the downstream side and in effect creates a bow wave of water upstream of the jet that diverges downstream of the jet as shown best in FIG. 3. The net effect is to prevent floating substances from reaching the jet 10, thus preventing mixing of an oil slick 22 with water by the jet, and to push such substances and materials laterally away from the jet as respects the direction of relative movement between the body of water 14 and the jet. This effect can be utilized most efficiently to confine and concentrate floating materials and substances, especially oil slicks, for pick up by a collecting device.

Figure 4:
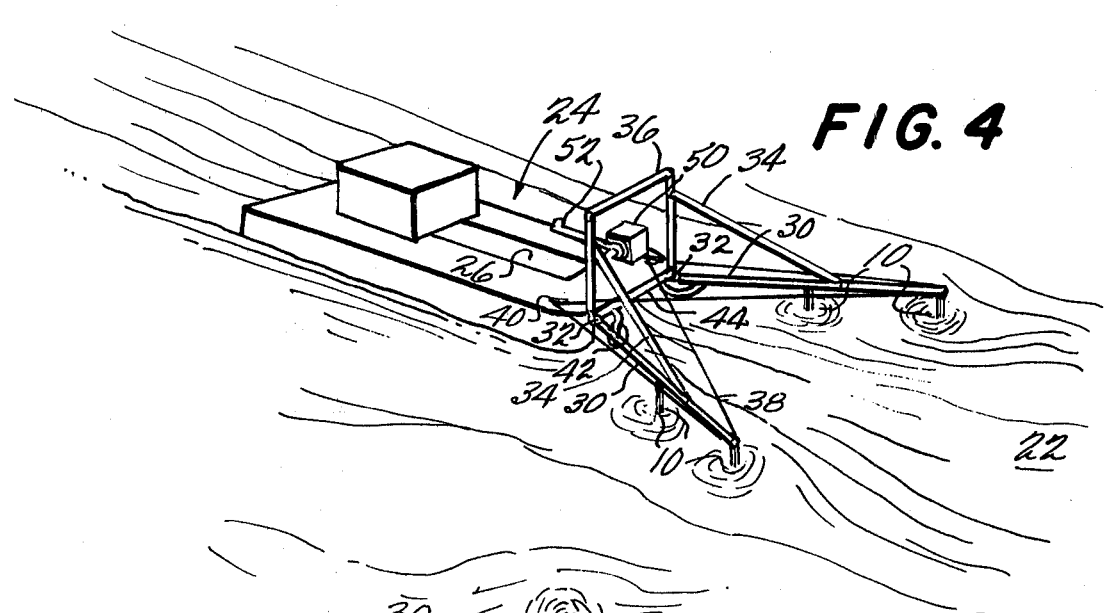
FIG. 4 is a perspective schematic view of a floating device embodying this invention for concentrating and collecting an oil slick.
Figure 5:
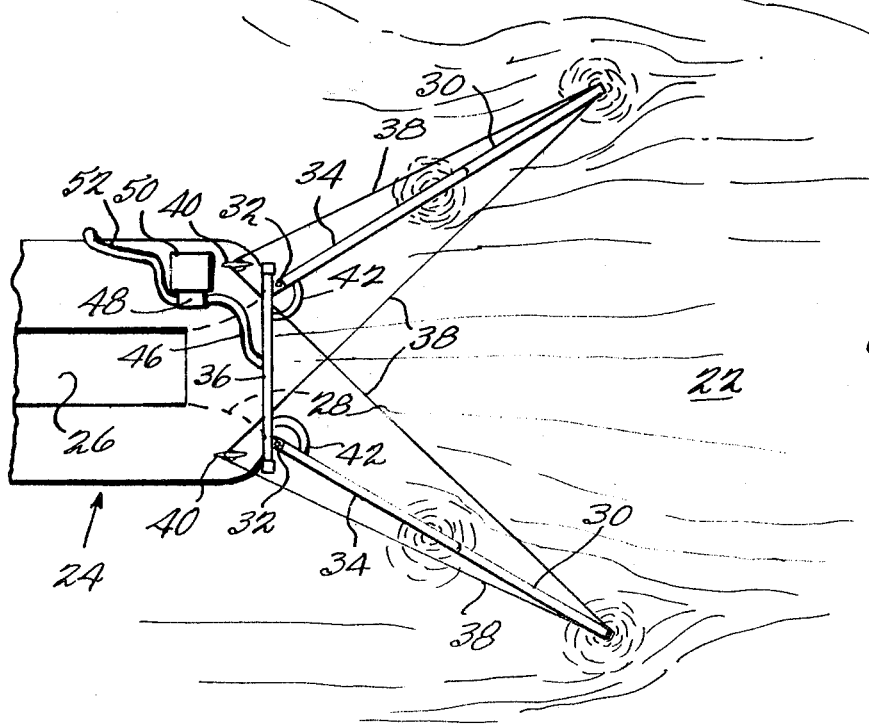
FIG. 5 is a fragmentary plan view of a portion of FIG. 4.

Referring now to FIGS. 4 and 5 of the drawings, there is shown a mobile floating device 24 for collecting oil spills from a body of a water which is provided with a typical embodiment of this invention for guiding, concentrating and funneling an oil slick 22 into the pick-up arrangement of device. The device 24 may be in the form of a self-propelled vessel having at its forward end a pick-up arrangement 26 of the skimmer type which is not shown in detail but which may be of any known type, such as those disclosed in the above-mentioned U.S. Pat. Nos. 3,659,713 and 3,708,070, that has an entrance 28 for the slick 22. In operation, the vessel 24 is driven forward and systematically sweeps an oil slick 22 to skim the latter off the surface of a body of water.

This invention is utilized to widen the swath covered by the vessel 24 and to gather, concentrate and funnel the slick 22 from a wide swath into the narrower entrance 28 of the pick-up arrangement 26 carried by the vessel. For this purpose, the vessel 24 is provided on opposite sides at its forward end with a pair of forwardly extending and diverging hollow booms 30, preferably hinged at their aft ends, as at 32, for horizontal swinging movement in order to adjust their angle of divergence. The booms 30 may be supported by suitable lines 34 secured to the booms intermediate their ends and to an elevated support 36 on the bow of the vessel 24. Suitable boom-adjusting lines 38 may be attached to the forward ends of the booms 30 and lead to appropriate cleats 40 on the deck of the vessel 24.

Secured to the forward end of each boom 30, and along their lengths, are downward directed nozzles designed to emit compact coherent jets 10 of water when suitably supplied with water under pressure. For this purpose the booms 30 may be hollow with closed ends and have the nozzles directly connected thereto. The booms 30 may be supplied with water under pressure via flexible conduits or hoses 42 connected thereto and to a manifold 44 connected, via a conduit 46, to the outlet of an appropriate water pump 48. The pump 48 is driven by any appropriate source of power, e.g., a motor 50, and has its inlet connected to a supply conduit 52 that may have its inlet end immersed in the body of water.

By actual test, it has been found that a jet diameter, at the nozzle, of the order of $\frac{3}{8}$ to $\frac{1}{2}$ inch, produces satisfactory results. The height of the nozzle, above water, should be such as to minimize spread or divergence of the jet 10 at water level while minimizing possible submergence of the nozzle due to wave action or pitching or rolling of the vessel 24. At the same time the source of the jet 10, i.e., the nozzle outlet, should be high enough above the surface of the body of water to insure adequate entrainment of air with the jet 10. The jet 10 should have sufficient velocity and volumetric flow rate to obtain adequate penetration depth, but this in turn depends on speed of advance of the vessel, number or spacing of the jets, and wave conditions. Within these parameters, water pressure of from about 10 to about 80 psi, with $\frac{3}{8}$ to $\frac{1}{2}$ inch nozzles, has been found to be satisfactory for reducing swath width of an oil slick adequately for funneling it into a pick-up arrangement without escape at the sides thereof. It also has been found that the jets need not be exactly vertical but can be angled slightly, e.g., of the order of a few degrees, e.g. 10°, in the upstream direction as respects movement of the jet relative to the body of water. It also has been found that the funneling effect of the jets on an oil slick is not affected by wave action, but can in fact be equal to or better than that achieved in calm water.

In a typical application where the vessel 24 is relatively small and boom length is less than vessel length, two jets 10, one on the forward end of each boom 30 may be sufficient for adequete funneling at fast speeds, e.g., on the order of six knots. At slower speeds, e.g., 2–4 knots, four jets, one on the forward end and one intermediate the ends of each boom 30, may be necessary for adequate funneling. This is a marked advantage over the use of spray or fan jets as disclosed in the above-mentioned U.S. Pat. No. 4,033,869, where about six such fan sprays are used on each boom. Compact coherent jets have more energy available over a small impingement area and thus are far less likely to entrain water with floating oil. Moreover, distribution systems for coherent compact jets are more cost, space and weight effective for controlling oil spills than systems employing fan or spray jets.

While the invention has been described in connection with funneling an oil slick into a mobile collection device of the skimmer type, it will be realized that the invention is susceptible of many other applications. For example, a line of coherent compact water jets angled to a current could be used to divert an oil slick away from a beach, the mouth of a harbor, or the like. Further, coherent compact water jets could be used for funneling undersirable floating debris of small size, e.g., garbage or the like, into an appropriate mobile collection device. Accordingly, the invention includes all applications and embodiments encompassed within the spirit and scope of the following claims:

I claim:

1. A method of moving shallow layers of substances, especially oil, floating on a body of water comprising:

directing a compact coherent rod-like jet of water substantially vertically downward into the body of the water at a velocity and volumetric flow rate sufficient to penetrate therein and create a crater in the surface thereof and from a height above such surface sufficient to entrain air which rises from the lower portion of the jet penetration and effects an upwelling of water about the crater that creates surface currents moving outward from the jet; and effecting relative horizontal movement between the jet and the body of water to create from the upwelling an upstream bow wave that diverges downstream of the jet and pushes shallow layers of substance floating on the body laterally away from the jet as respects the direction of the relative movement, the floating substance sliding down the bow wave in front of the jet so that contact of the jet with the substance is minimal and there is substantially no mixing of the substance with the water.

2. The method defined in claim 1 in which there are at least two jets spaced laterally as respects the direction of relative movement whereby shallow layers of the substance floating on the body between the jets are funneled together downstream of the jets.

3. The method of sweeping or confining an oil spill on a body of water in relation to a selected surface area, comprising:

directing at least one compact coherent rodlike jet of water substantially vertically downward onto said body of water adjacent an edge of the area at a velocity and volumetric flow rate sufficient to penetrate into the body and create a crater in the surface thereof and from a height sufficient to entrain air which rises from the lower portion of the jet penetration and effects an upwelling of water about the crater that creates surface currents moving outward from the jet that carry the floating oil into the area; and effecting relative horizontal movement between the jet and the body of water along the edge of the area to create from the upwelling an upstream bow wave that diverges downstream of the jet and pushes the floating oil laterally away from the jet and into the area, the floating oil sliding down the bow wave in front of the jet so that contact of the jet with the oil is minimal and there is substantially no mixing of the oil with the water.

4. The method defined in claim 3 in which there are at least two jets spaced apart along the edge of the area.

5. The method defined in claim 3 in which there are at least two jets disposed on opposite edges of the area whereby the downstream divergence of the bow waves funnels floating oil between the edges downstream of the jets.

* * * * *